May 1, 1928.
W. G. HOLLEY
1,668,528
DOUBLE LOCKING CONNECTING LINK
Filed Jan. 27, 1928
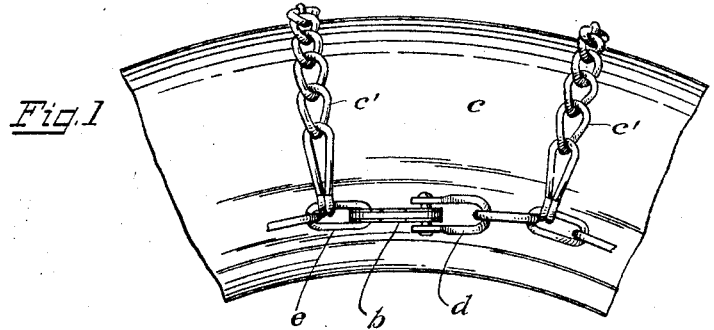
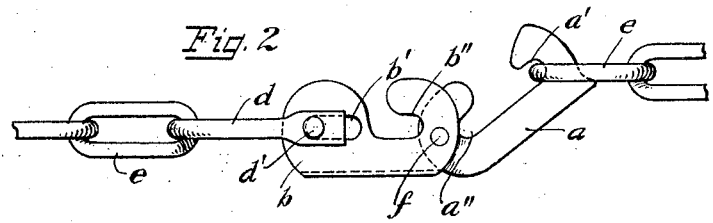
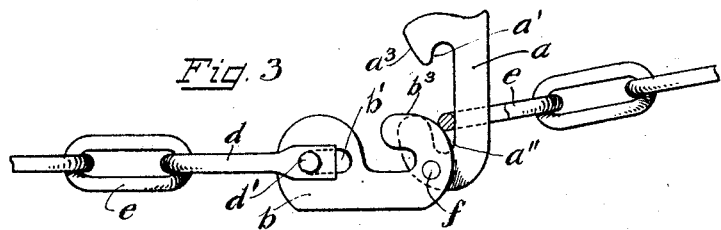
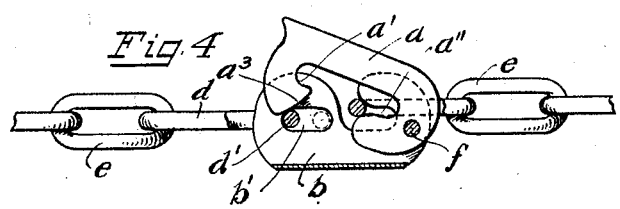
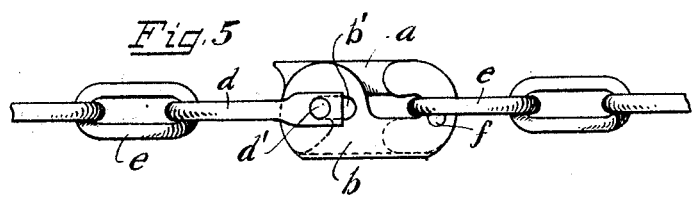
Inventor:
William G. Holley
by
Attorney.

Patented May 1, 1928.

1,668,528

UNITED STATES PATENT OFFICE.

WILLIAM G. HOLLEY, OF WAPAKONETA, OHIO, ASSIGNOR TO THE KREIN CHAIN COMPANY, OF WAPAKONETA, OHIO, A CORPORATION OF OHIO.

DOUBLE-LOCKING CONNECTING LINK.

Application filed January 27, 1928. Serial No. 249,855.

My invention relates to improvements in double-locking connecting-link for automobile anti-skid chains, and the like, and has for its object the provision of a device of this general character which will eliminate any accidental unlocking of the connecting member, while facilitating the act of making connection between two terminals normally tensioned.

Prior devices of this general character have included locking means of one sort or another designed to prevent the accidental unfastening of but one of the attached chain ends. However, in practical use, it is found that the driving conditions are such as to relax the normal pull or tension exerted by the side chains to the extent that these single locking connectors will become disconnected, resulting in the unfastening and even loss of the anti-skid chains. With some types of such fasteners, furthermore, this difficulty is materially increased upon backing the vehicle. Again, many drivers prefer to drive with rather loose side chains, thus contributing to the likelihood of the connectors becoming unfastened.

Those types of chain connector which depend in part or entirely upon frictional means, such as semi-tight casings or rivets, tend to grow more and more undependable as to their locking function, with the continued use and wear of the parts.

Accordingly, it has been my purpose to provide and construct a type of connecting link which insures, by its double-locking means, acting upon or by means of both ends of the chain, complete security against accidental separation of the connected terminals. Moreover, by applying an integral hook member of substantial cross section as the lever for closing or approximating the separated chain ends, I have insured a sturdy and more dependable and durable structure than any like device of the prior art with which I am acquainted.

My improvements may best be explained in connection with the accompanying drawings illustrating the preferred embodiment of my invention, wherein:

Figure 1 is a fragmentary view of a tire casing showing two of the skid cross-chains, a side chain and its connector, all in position thereon, Fig. 2 is a view of my improved connecting link with the elements thereof shown in their initial position, Fig. 3 is a similar view with the chain ends partly approximated, Fig. 4 is another view, partially in section, showing the elements and terminal links of the chain about to be actuated into the final or locking position, and Fig. 5 illustrates the device with the double-lock in effect.

Throughout the several figures of the drawings I have employed the same character of reference to indicate similar parts.

An inspection of the drawings discloses a connecting link comprising a C-shaped hook $a$ of peculiar configuration pivoted to a reversely positioned and partly symmetrical casing $b$ of enclosing sheet metal. The left end of the chain is secured to the casing $b$ by the U-shaped link $d$ and rivet or pin $d'$ passing through the longitudinal slot $b'$ in said casing. The opposite end of the side chain is freely detachable, but its terminal link $e$ is adapted to engage interiorly first one end and then the other of hook member $a$.

This C-shaped hook member is provided with recessed slots $a'$ and $a''$, respectively corresponding with the slots $b'$ and $b''$ reversely provided at the sides thereof in the pivoted casing $b$. A substantial pivot $f$ positioned adjacent to the axis of the connecting link serves to unite these members and permits the hook $a$ to be used as a lever in approximating and uniting the chain ends.

Thus there is provided an integral lever member of substantial cross section which is decidedly preferable to employing the sheet metal casing for this purpose, as will appear.

Upon manually actuating the hook $a$ into substantially rectangular position with respect to the casing $b$, link $e$ is drawn toward the opposite terminal $d$ of the chain where it rides upon the curved periphery $b^3$ of the casing from the position shown in Fig. 2 to that of Fig. 4, with the continued pivotal movement of the hook-lever member $a$.

The cam face $a^3$, adjacent to the free end of hook $a$ and slot $a'$, will now engage the rivet $d'$ of link $d$ serving to force it slightly to the right, or dotted line position, whereupon the parts will assume the double-lock relation of Fig. 4. It will be noted that not only is the left hand link locked in the alining slots $a'$, $b'$, of the hook and its casing, but the right hand link similarly is locked between the alined slots $a''$, $b''$, so that both of these links must be simultaneously relaxed in order that the connecting link may be opened. Obviously this is practically impossible of accomplishment, except manually when it is desired that the side chain shall be removed from the tire casing.

In Fig. 1 there is shown the tire casing $c$ with two anti-skid cross-chains $c'$ in operative position thereon; the latter attached in the usual manner to the side chain, terminally connected by the double-locking connecting-link of my invention. It has been explained above how readily the side chain may be semi-automatically connected in the double-locking relation, and although the manual unlocking of the side chain is accomplished with the same facility as with ordinary connecting links, the accidental opening of the connecting link of my invention is rendered highly improbable because of the lock provided by the normal tension of the chain at both ends of the link.

Having now described the preferred embodiment of my invention, I claim as new and desire to secure by Letters Patent, the following:

1. In a connecting device of the class described, the combination with a C-shaped hook member open intermediate at one side and slotted at both of its ends, of an associated locking member provided with similar registering slots when the device is in locking position, and a pivot operatively connecting said members, substantially as set forth.

2. In a connecting device of the class described, the combination with a C-shaped hook member open intermediate at one side and slotted at both of its ends, of a normally enclosing casing therefor provided with similar registering slots when the device is in locking position, and a pivot positioned adjacent to the axis of the device operatively connecting its members adjacent to one end of said device, substantially as set forth.

3. In a double-locking connecting-link, the combination with an integral substantially C-shaped hook member open intermediately at one side and slotted at both of its ends, of a normally enclosing casing therefor provided with similar registering slots when the device is in locking position, a terminal member disposed in one of said slots, a pivot operatively connecting the hook member and casing, and a second terminal member adapted removably to occupy the opposing slots to provide a second locking member when the device is in locking position, substantially as set forth.

4. In a double-locking connecting-link, the combination with an integral substantially C-shaped hook member open intermediately at one side and slotted deeply at both of its ends, of a normally enclosing and partly symmetrical casing therefor provided with similar registering slots when the device is in locking position, a terminal member slidably secured in one of said slots, a pivot operatively connecting the hook member and casing adjacent to one of their ends; said C-shaped member having a cam face adapted to actuate the terminal member within its slot, and an opposing terminal member adapted removably to occupy opposing slots in the casing and hook to provide a second locking member co-operating with the first named terminal member, when the device is in locking position, substantially as set forth.

5. In a double-locking connecting-link, the combination with an integral C-shaped hook member open intermediately at one side and slotted deeply at both ends, of a normally enclosing sheet metal casing provided with similar registering slots when the device is in locking position, a terminal member slidably secured in one of said slots, a pivot operatively uniting said member and casing permitting the latter to free the open side of the hook in open position, and an opposing terminal member adapted to be actuated toward the first named terminal by said pivoted hook and into locking position in the opposing slots, substantially as set forth.

In testimony whereof I do now affix my signature.

WILLIAM G. HOLLEY.